E. T. NELSON.
HAY LOADER.
APPLICATION FILED JULY 26, 1915.
1,167,651.
Patented Jan. 11, 1916.
7 SHEETS—SHEET 6.
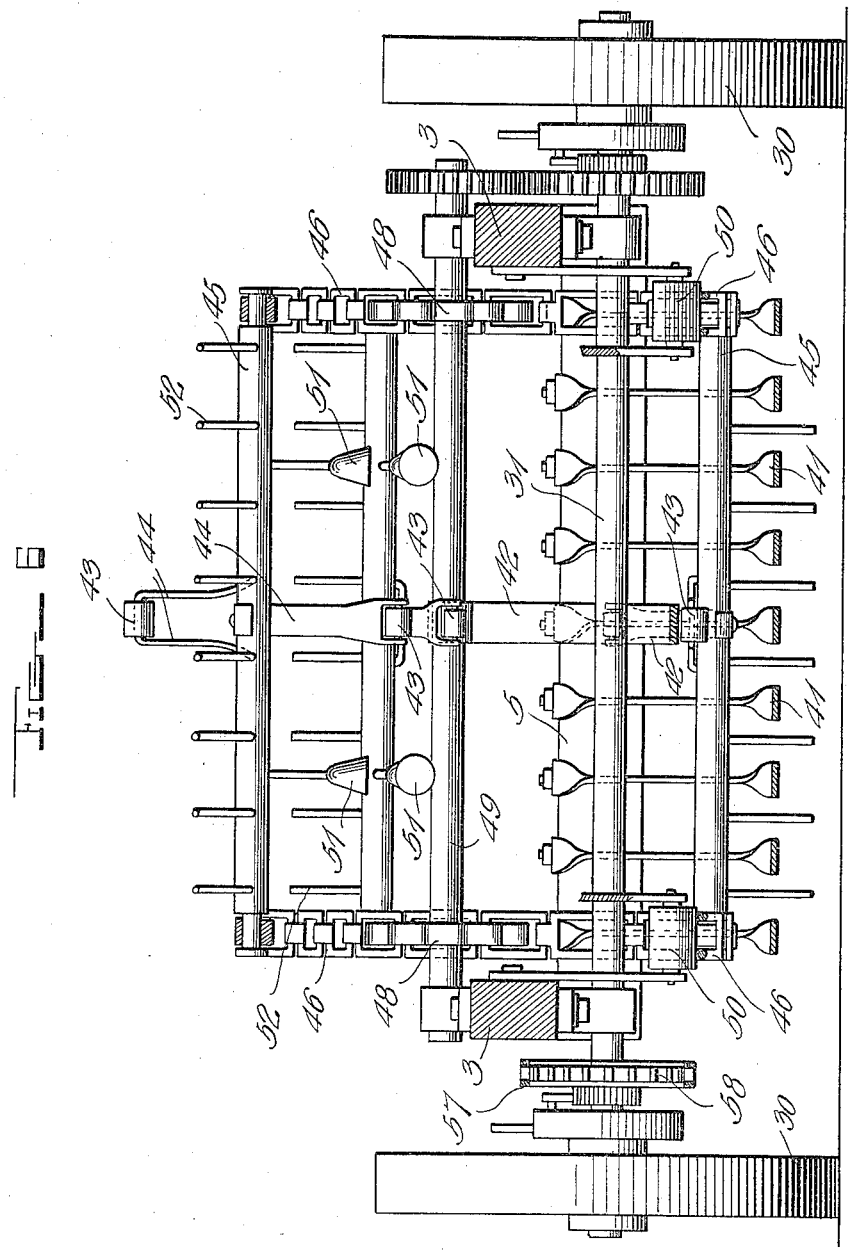
Witnesses
C. [illegible]
H. Woodard
Inventor
Edwin T. Nelson
By H. B. Willson & Co.
Attorneys

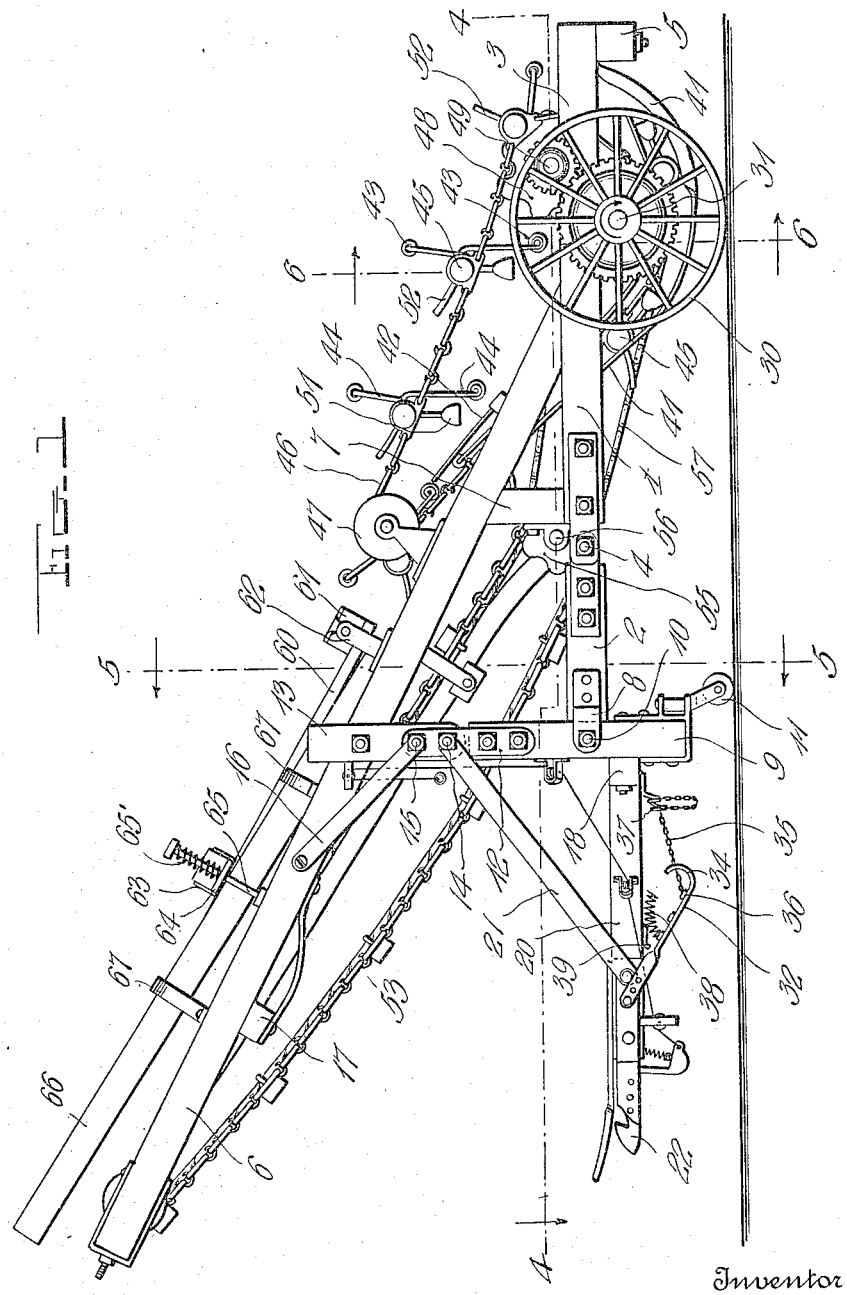

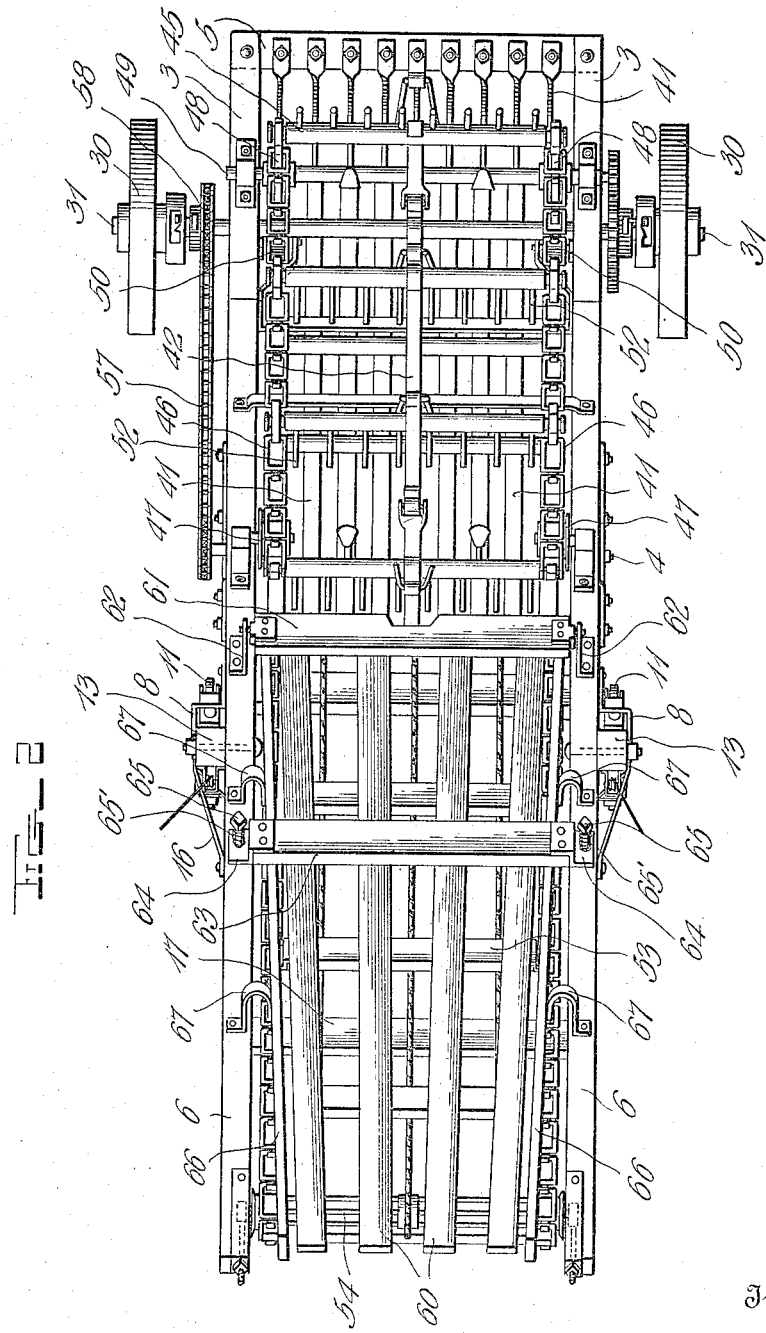

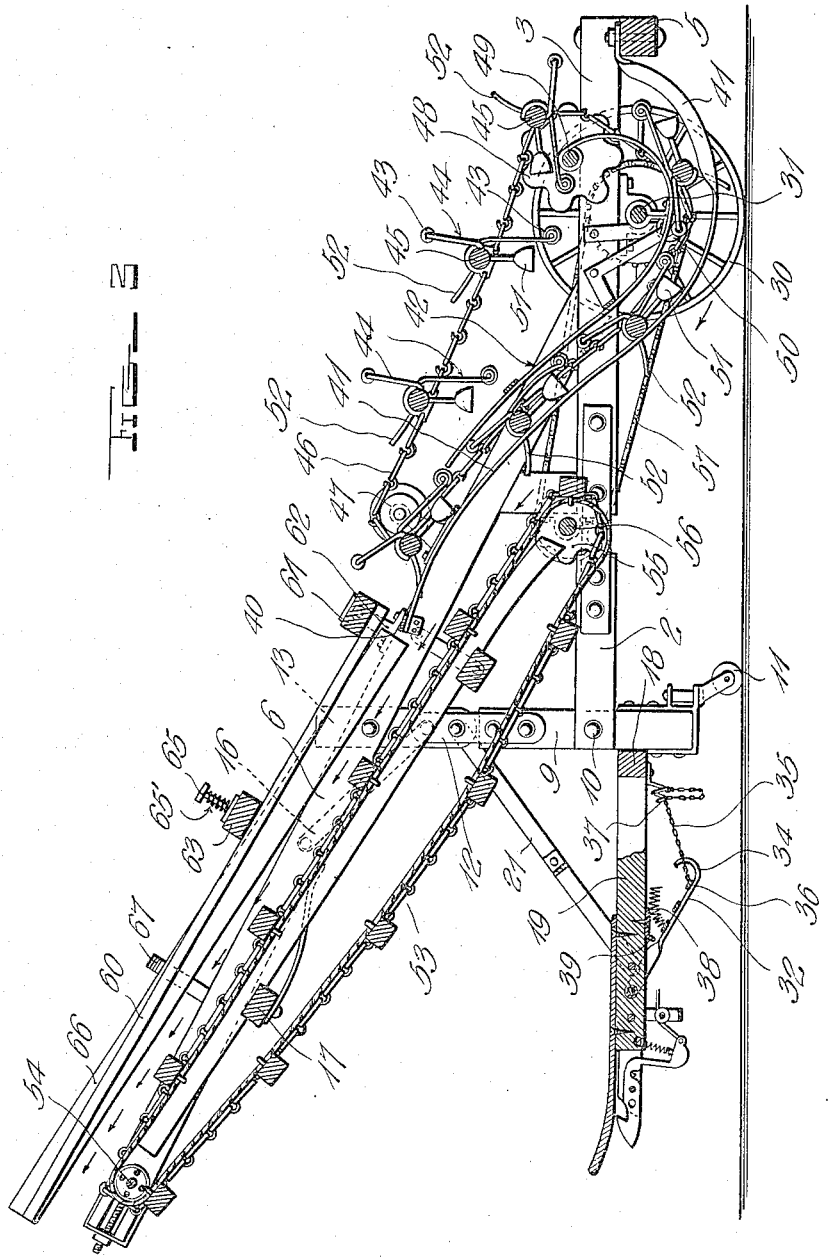

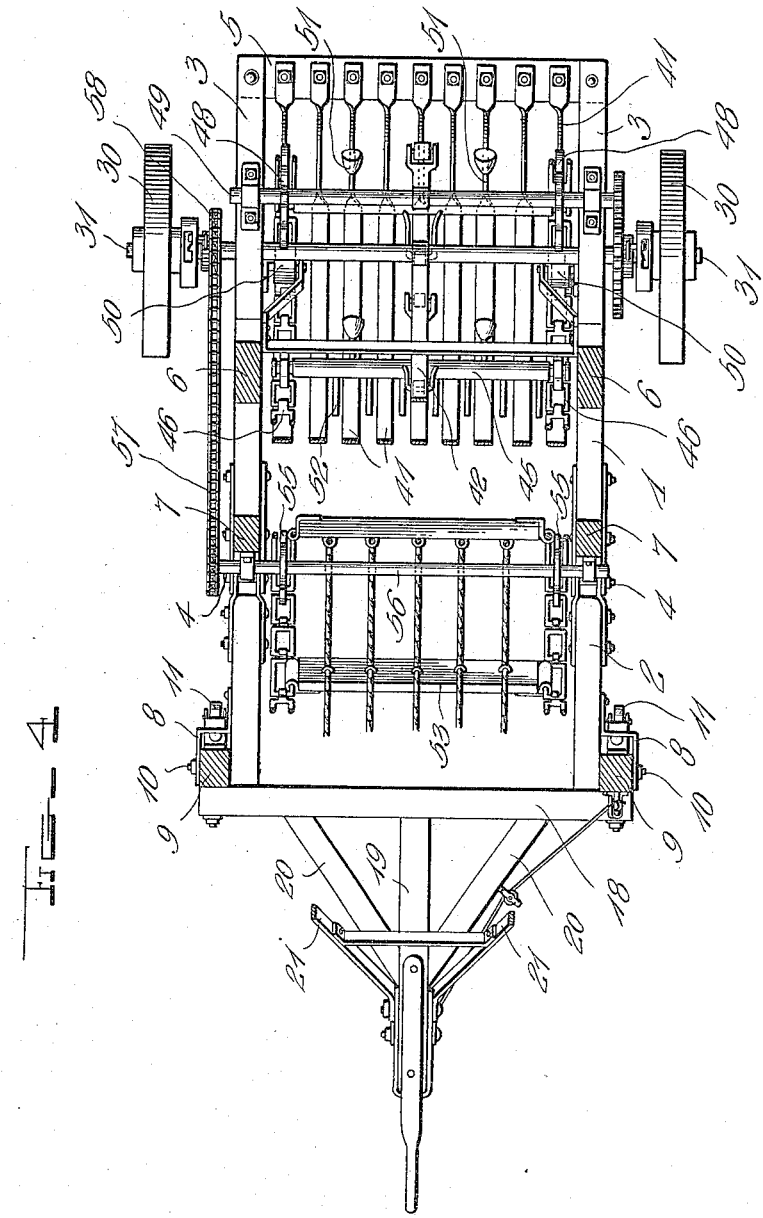

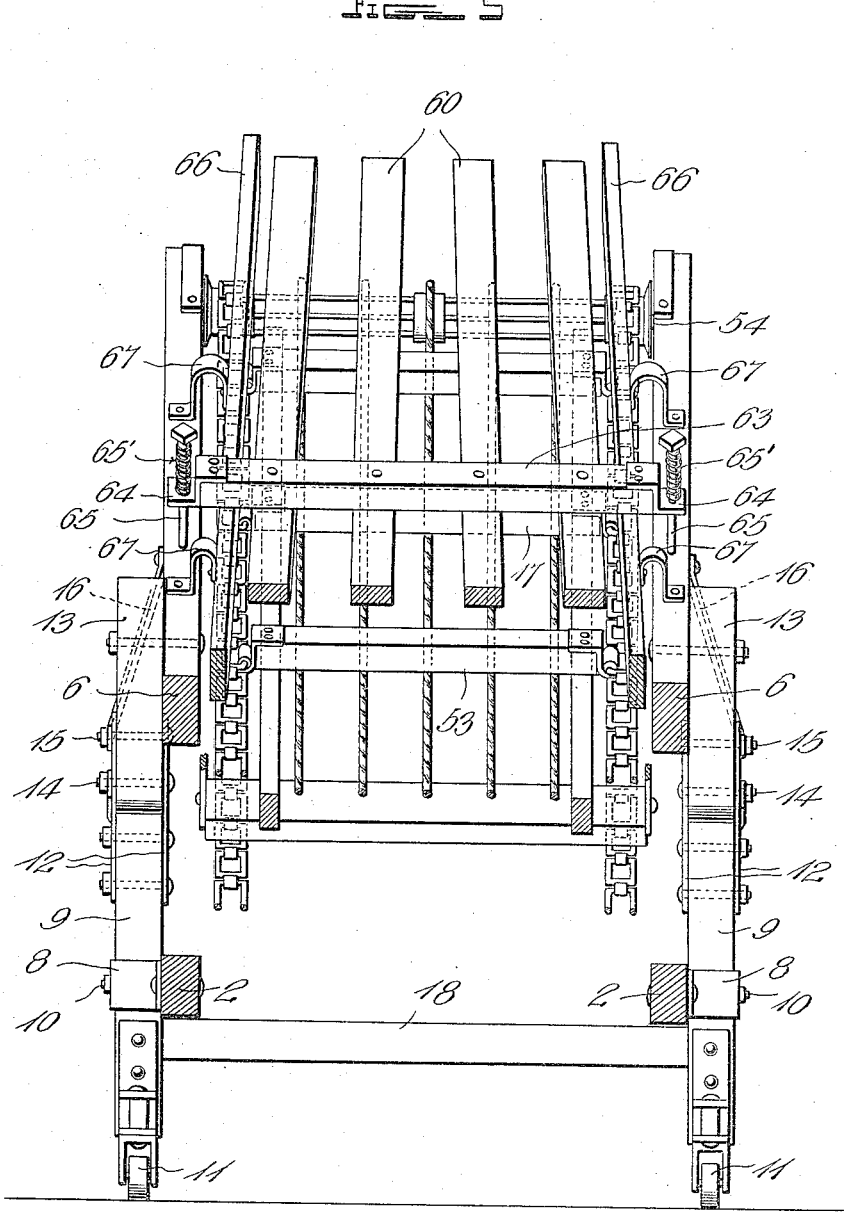

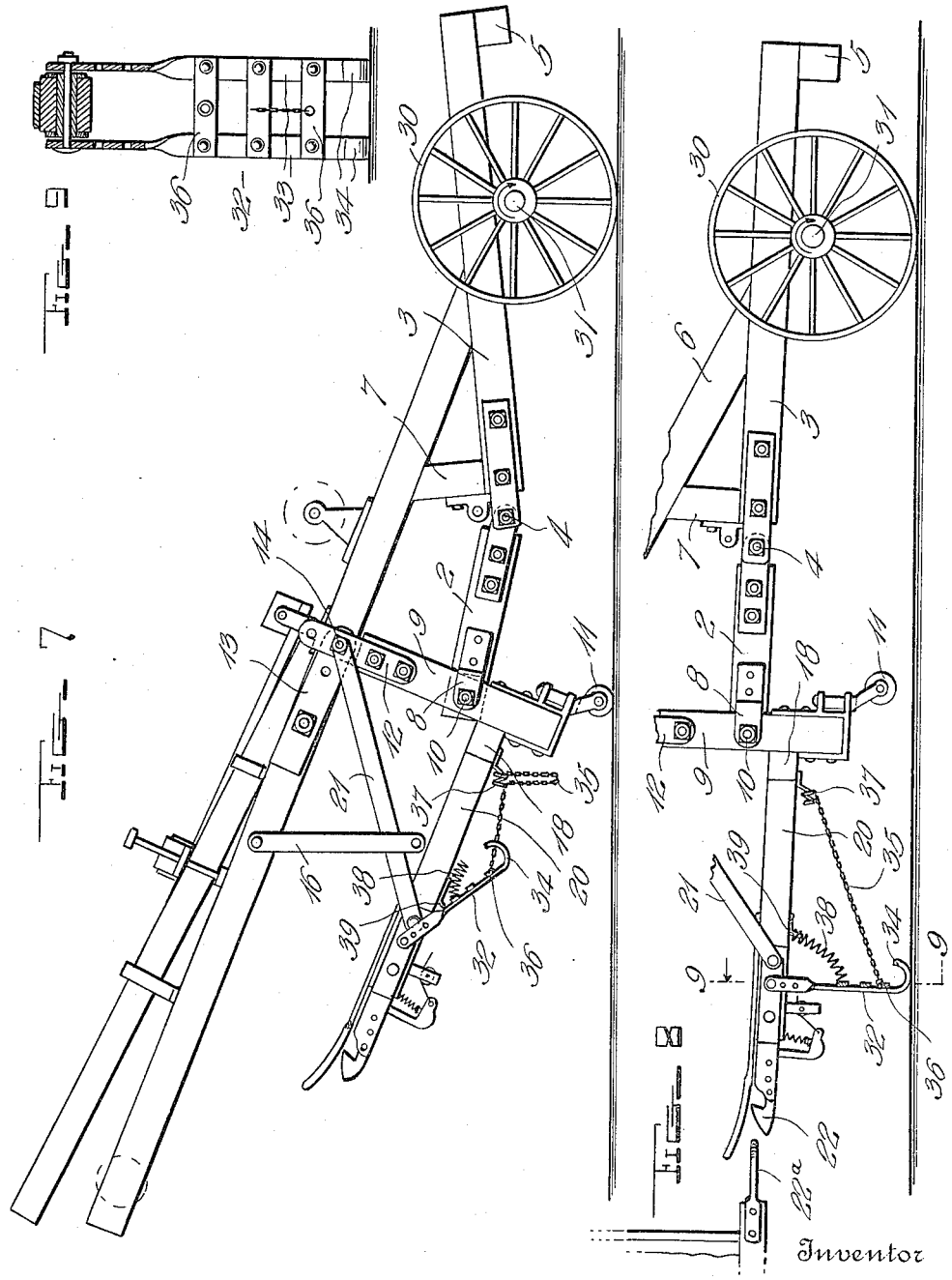

UNITED STATES PATENT OFFICE.

EDWIN T. NELSON, OF ST. OLAF, IOWA.

HAY-LOADER.

1,167,651.  Specification of Letters Patent.  Patented Jan. 11, 1916.

Application filed July 26, 1915. Serial No. 41,993.

*To all whom it may concern:*

Be it known that I, EDWIN T. NELSON, a citizen of the United States, residing at St. Olaf, in the county of Clayton and State of Iowa, have invented certain new and useful Improvements in Hay-Loaders; and I do declare the following to be a full, clear, and exact description of the invention, such as will enable others skilled in the art to which it appertains to make and use the same.

My invention relates broadly to improvements in hay handling apparatus and more particularly to hay loaders.

The main object of the invention is to provide a machine of this class which although being of the necessary dimensions for most effectively loading, may be so folded as to allow the same to be stored within a barn or shed having doors of ordinary height.

Another object is to construct the machine in a comparatively simple and inexpensive manner, yet in such a way as to provide a device which will be efficient and durable, and which will possess a number of advantageous characteristics.

With these general objects in view, the invention resides in certain novel features of construction, and in unique combinations of parts to be hereinafter fully described and claimed.

In describing the invention, I shall refer to the accompanying drawings by similar reference characters placed on corresponding parts throughout the several views.

In these drawings: Figure 1 is a side elevation of a loader constructed in accordance with my invention showing the same in condition for use: Fig. 2 is a top plan view; Fig. 3 is a central vertical longitudinal section; Fig. 4 is a horizontal section as viewed along the plane of the line 4—4 of Fig. 1; Figs. 5 and 6 are vertical transverse sections taken on the planes designated by the lines 5—5 and 6—6 of Fig. 1; Fig. 7 is a diagrammatic side elevation with parts removed for the sake of clearness, showing the machine in folded position; Fig. 8 is a fragmentary side elevation illustrating the application to use of a supporting shoe to be described; Fig. 9 is a detail vertical section taken along the plane designated by the line 9—9 of Fig. 8.

In the embodiment illustrated, the numeral 1 designates broadly a horizontal base frame which is formed of a front section 2 and a rear section 3 hinged together at 4, the rear section 3 being provided with a rigid transverse bar 5 at its rear end.

Rigidly secured to the intermediate portions of the side bars of the rear section 3, are the side bars 6 of a conveyer frame, said bars being inclined upwardly and forwardly as clearly disclosed in the several figures of the drawings and being braced in respect to the frame section 3 by the upright standard members 7.

Secured by any preferred means to the front end of the frame section 2, and disposed one at each side of the machine, is a pair of angular brackets 8 between the forward ends of which and said frame section 2, the intermediate portions of the lower standard sections 9 are disposed, bolts or the like 10 being passed through the brackets 8, through the adjacent portions of the frame 2 and through the intervening standard sections 9 whereby to pivotally connect the latter to said frame.

The lower ends of the standard sections 9 carry caster wheels or other appropriate earth engaging devices 11, while bolted or otherwise secured to, and projecting above the front ends of said sections, are the pairs of upright plates 12 between which upper standard sections 13 are disposed, said sections 13 being hinged to the plates 12 by bolts or the like 14 and being normally held in alinement with the sections 9 by additional bolts 15 which pass through the upper ends of said plates and through the sections 13, as clearly shown in Fig. 1. The bolts 15 likewise pass through the rear lower ends of inclined brace bars 16 which are connected to the intermediate portion of the side bars 6 of the conveyer frame, such bars being further braced by a transverse bar 17 secured thereto near the front ends thereof.

Rigidly secured to the lower end portions of the lower standard sections 9 by bolts or the equivalents thereof, is a transverse beam 18 from which a horizontal tongue 19 projects forwardly, braces 20 being preferably provided leading from said tongue to the beam, while additional braces 21 lead from said tongue to the sectional standards, said braces being here shown as secured to said standards by the bolts 14 above described.

By constructing the frame structure in the manner so far described, the same will be rigid when in operation, or in other words when the front end of the machine is raised a predetermined distance and is connected by coupler 22 with a loop or the like 22ª carried by the wagon to which the machine is applied (see Fig. 8) but when the machine is to be stored in a shed or barn, the framework may be collapsed to the position shown in Fig. 7 by removing the bolts 15, and by forcing the tongue 19 upwardly. This movement of the tongue causes the lower standard section 9 to tilt rearwardly and allows the upper sections 13 to swing downwardly and forwardly, thus allowing the entire conveyer frame to lower during which operation the hinge joint 4 comes into use as clearly disclosed in the figures above mentioned. When the framework is collapsed in this manner, it is of such height as to allow it to pass readily through a door of ordinary height. As is evident by an inspection of Figs. 1 and 3, previous to being collapsed and after collapsing, the entire machine is supported by the caster wheels 11 and by a pair of driving wheels 30 mounted on an axle 31 beneath the rear frame sections 3, these wheels now allowing the machine to be readily moved into the housing therefor.

As heretofore suggested, when the machine is in operation, the entire front end thereof is raised to the proper extent, and the machine is now held in this position by the coupler 22 and the loop 22ª carried by the wagon, but when a load of hay has been gathered and the wagon is to be uncoupled from the loader for carrying such load to a predetermined point, it becomes expedient to provide suitable means for supporting the front end of the loader at the proper height for allowing the wagon to be again readily coupled thereto. For this purpose, the vertically swinging shoe member 32 has been provided, such member comprising a pair of parallel bars 33 having rearwardly curved lower ends 34 adapted to contact with the earth when the aforesaid member 32 is swung to the position shown in Fig. 8. Normally, however, the member 32 is held in raised position by a chain or the like 35 secured to one of a series of cross bars 36 connecting the bars 33, said chain having an adjustable connection with an appropriate hook member 37 carried by the tongue or by another appropriate part of the machine. For retaining the member 32 in upright position while the machine stands idle in the field, a heavy coiled spring 38 is secured at one end to one of the cross bars 36 and is passed removably over a stud 39 on the tongue as clearly shown in Fig. 8, but when the machine is not used or is to be collapsed for storing, the spring 38 is removed from the stud 39 and the chain 35 is shortened to maintain the member 32 in approximately the position disclosed in Fig. 3.

By the detail of construction just described, although the same is simple, the front end of the machine will be supported in proper position to allow the loop 22ª to be readily received by the coupler 22 when the machine is to be again coupled to the wagon.

The features above described are the most salient of the invention and might well operate with a number of types of raking and conveying means, but the preferred forms of such means is depicted in the drawings and may be briefly described as follows:

Secured at their rear ends to the transverse bar 5, and extending forwardly therefrom to an additional transverse bar 40, is a plurality of curved slats or the like 41 having depressed rear portions passed beneath the axle 31, while above the aforesaid slats, is a central curved track 42 for coaction with anti-friction rollers or the like 43 on the ends of crank arms 44 which extend in opposite directions from a plurality of transverse rock shafts 45 mounted in appropriate bearings on a pair of endless chains 46, said chains being trained over front guide pulleys 47 which are carried by the side bars 6 in rear of the sectional standards, around driven sprockets 48 carried by a drive shaft 49 which is mounted on the rear end of the frame section 3, and around idlers 50 disposed below and slightly in advance of the axle 31. The rock shafts 45 carry weighted arms 51 and appropriate rakes 52, said rakes being disposed downwardly to active position for gathering hay by the contact of the rollers 43 with the track 42, as the several rock shafts 45 are moved forwardly and upwardly, and the arms 44 on the rearwardly moving shafts 45 are held in proper position for contact with the track, by the weighted arms 51 as clearly shown in Fig. 3.

The rakes 52 deliver the material gathered thereby to an endless belt conveyer 53 which is trained over appropriate guide pulleys or the like carried by a shaft 54 at the upper end of the conveyer frame and around driving sprockets 55 carried by a transverse shaft 56 revolubly mounted on the front end of the frame section 3, said shaft 56 being driven by a sprocket chain 57 from a sprocket 58 on axle 31.

To prevent the hay from being blown from the conveyer 53, a plurality of parallel guard slats 60 is preferably provided above the upwardly moving reach of said conveyer, the rear ends of said slats being secured to a transverse bar 61 which is pivoted at its ends in brackets 62 rising from the side bars 6, while the intermediate portions of said slats are secured to a transverse bar 63 having guide ears on its opposite ends receiving therein headed rods 65 which likewise rise from the side bars 6, coiled springs 65' being interposed between the ears 64 and the heads at the upper ends of the aforesaid rods. By this means, the slats 60 are retained in contact with the upwardly moving body of hay at all times and in case of excessive load, such slats may yield outwardly to compensate therefor.

Coöperating with the slats 60, is an additional pair of slats 66 which are interposed substantially between the outermost of said slats 60 and the conveyer 53, said slats 66 being here shown as carried by arched leaf springs 67 which are secured thereto at one end and at their other end to the bars 6. By this provision, an excessive load of hay may be further compensated for since under such conditions, the slats 66 will yield laterally against the spring 67.

From the foregoing description, taken in connection with the accompanying drawings it will be evident that although the machine is comparatively simple, it will be highly efficient and durable and will possess a number of advantageous characteristics, particular emphasis being laid upon the provision of the folding frame structure and upon the fact that by such structure, all driven parts of the machine are carried rigidly by the rear frame section thus facilitating the driving thereof, it being unnecessary to adjust any driving means or any movable parts of the machine when the same is being collapsed.

In the drawings, a number of specific details of construction have been shown for accomplishing probably the best results, and in the preceding such details have been described, but it is to be understood that I do not wish to be limited to such details otherwise than to the extent to which the appended claims restrict me.

I claim:

1. In a hay loader, a horizontal base frame formed of a front and a rear section hinged together, a truck for supporting the rear section, a conveyer frame secured to the rear section and inclined upwardly and forwardly therefrom, a standard formed of an upper and a lower section hinged together, a pivotal connection between the intermediate portion of the lower standard section and the front end of the front frame section, an additional pivotal connection between the upper standard section and the conveyor frame, releasable means normally imparting rigidity to the two hinge points, an additional truck carried by the lower end of the lower standard section, and a rigid tongue extending forwardly from said lower section.

2. In a hay loader, the combination of a rear horizontal wheel supported frame section, a front horizontal frame section hinged to the other section on a horizontal axis, a conveyer frame rigidly secured to the rear frame section and inclining upwardly and forwardly therefrom, a pair of upright lower standard sections hinged between their ends to the front end of the front frame section, supporting wheels on the lower ends of said standard sections, a transverse bar rigidly connecting said standard sections near their lower ends, a tongue extending rigidly from said transverse bar in a forward direction, a pair of upper standard sections pivoted at their upper ends to the conveyer frame and hinged at their lower ends to the upper ends of the lower standard sections, and a pair of releasable inclined retaining bars extending from the conveyer frame to certain of the aforesaid standard sections, whereby to normally impart rigidity to all of the hinged points.

3. In a hay loader, the combination of a rear horizontal wheel supported frame section, a conveyer frame rigidly secured thereto and inclining upwardly and forwardly therefrom, a front horizontal frame section hinged to the front end of the rear section on a horizontal axis, a pair of upright lower standard sections pivoted between their ends to the front corners of the front frame section and having supporting wheels on their lower ends, a transverse bar rigidly connecting the lower end portions of said standard sections, a tongue rigidly secured to and extending forwardly from said bar, a pair of spaced plates secured to and rising from the upper end of each standard section, upper standard sections having their lower ends interposed between the plates of said pairs, their upper ends being pivoted to the conveyer frame, upper and lower bolts passed through the pairs of plates and through the intervening lower ends of the upper standard sections, brace bars extending from the uppermost of said bolts to the conveyer frame, and additional brace bars extending from the lowermost of said bolts to the tongue.

In testimony whereof I have hereunto set my hand in presence of two subscribing witnesses.

EDWIN T. NELSON.

Witnesses:
D. D. MURPHY,
JARKELER NELSON.

Copies of this patent may be obtained for five cents each, by addressing the "Commissioner of Patents, Washington, D. C."